(12) United States Patent
Tsuji

(10) Patent No.: US 7,866,901 B2
(45) Date of Patent: Jan. 11, 2011

(54) LENS BARREL AND IMAGE-PICKUP APPARATUS

(75) Inventor: Kanji Tsuji, Tokyo (JP)

(73) Assignee: Canon Kabushiki Kaisha (JP)

( * ) Notice: Subject to any disclaimer, the term of this patent is extended or adjusted under 35 U.S.C. 154(b) by 720 days.

(21) Appl. No.: 11/548,699

(22) Filed: Oct. 12, 2006

(65) Prior Publication Data

US 2007/0133981 A1 Jun. 14, 2007

(30) Foreign Application Priority Data

Oct. 17, 2005 (JP) .............................. 2005-301820

(51) Int. Cl.
*G03B 17/00* (2006.01)

(52) U.S. Cl. ..................................... 396/448

(58) Field of Classification Search .................. 396/448
See application file for complete search history.

(56) References Cited

U.S. PATENT DOCUMENTS 6,575,642 B2 * 6/2003 Nozawa et al. .............. 396/349
6,657,795 B2 * 12/2003 Nishimura et al. .......... 359/699
6,752,540 B2 * 6/2004 Orimoto ...................... 396/349
7,125,177 B2 * 10/2006 Onda .......................... 396/448
2005/0025476 A1 * 2/2005 Onda .......................... 396/448

FOREIGN PATENT DOCUMENTS

CN 1648708 A 8/2005
JP 06-027519 A 2/1994

* cited by examiner

*Primary Examiner*—W. B. Perkey
(74) *Attorney, Agent, or Firm*—Rossi, Kimms & McDowell LLP

(57) ABSTRACT

A lens barrel capable of being reduced in length in a collapsed position. Barrier members have an opening/closing operation plane that openably/closably covers the front face of an image-taking lens. A barrier drive mechanism causes the barrier members to perform opening/closing operation. A lens holding member has a holding portion that holds the image-taking lens and a guide portion that guides the image-taking lens in the optical axis direction. A lens drive mechanism causes the lens holding member to move forward or backward in the optical axis direction. A stroke area of the guide portion of the lens holding member is set to overlap the opening/closing operation plane of the barrier members in the optical axis direction.

4 Claims, 16 Drawing Sheets

LENS BARREL AND IMAGE-PICKUP APPARATUS

BACKGROUND OF THE INVENTION

1. Field of the Invention

The present invention relates to a lens barrel and image-pickup apparatus having a focus mechanism and a barrier mechanism that includes a barrier member disposed on the front side of the lens barrel for protection of an image-taking lens.

2. Description of the Related Art

As a lens barrel mounted in a camera, there is conventionally known a lens barrel having a barrier mechanism and a focus mechanism. The barrier mechanism is for causing a barrier member disposed on the front side of the lens barrel to open and close with advancing and receding movements of the lens barrel in the optical axis direction between an image-taking position and collapsed position thereof. When the lens barrel is in the collapsed position, the barrier mechanism closes the barrier member to protect a lens group that is disposed on the front-most side of the lens barrel. The focus mechanism is for driving the front-most side lens group in the optical axis direction for focus operation.

In the following, an explanation will be given of a lens barrel having a barrier mechanism and a focus mechanism according to Japanese Laid-Open Patent Publication (Kokai) No. H06-027519. It should be noted that reference numerals used herein are those shown in the Patent Publication No. H06-027519.

First, the barrier mechanism will be explained. The barrier mechanism is constructed of a drive ring 4 disposed between barriers 2, 3 and a barrel frame 1; springs 5, 6 hooked between the barriers 2, 3 and the drive ring 4; and a spring 7 hooked between the drive ring 4 and a dowel 1c of the barrel frame 1. The barriers 2, 3 are opened and closed with rotation of the drive ring 4.

Next, an explanation will be given of the focus mechanism. In the focus mechanism, a bar 9 serving as a guide is supported by a frame (not shown) for linear movement and is adhered to a barrel unit 8, and a pin 10 disposed in contact with a cam 11 is fixed to the barrel unit 8. With rotation of the cam 11, the barrel unit 8 is caused to move in unison with the bar 9 in the optical axis direction for focus operation. The lens barrel is designed that the bar 9 is in contact with a protrusion 4c of the drive ring 4 when the barrier is not fully opened, thereby preventing further advancing movement of the barrel unit 8 until the barrier is fully opened.

With the lens barrel proposed in Japanese Laid-Open Patent Publication (Kokai) No. H06-027519, however, the guide for guiding the movement of the barrel unit 8 in the optical axis direction and a movement stroke (focus stroke) of the lens group must be provided behind the drive ring 4. In other words, a focus stroke area and a barrier opening/closing operation plane must be arranged in series as viewed in the optical axis direction (on the lens group side of the drive ring 4), which poses a problem that the lens barrel is large in length (collapsed length) in the collapsed position. Furthermore, since the bar 9 serving as the guide for guiding the movement of the barrel unit 8 in the optical axis direction is adhered to the barrel unit 8, the lens barrel is disadvantageous in construction from the viewpoint of securing the required parallelism between the lens optical axis and the bar 9.

SUMMARY OF THE INVENTION

It is an object of the present invention to provide a lens barrel and an image-pickup apparatus capable of being reduced in length (collapsed length) in a collapsed position.

To attain the above object, according to a first aspect of the present invention, there is provided a lens barrel comprising a barrier member that openably/closably covers a front face of an image-taking lens, a barrier drive mechanism that causes the barrier member to perform opening/closing operation, a lens holding member having a holding portion that holds the image-taking lens and a guide portion that guides the image-taking lens in an optical axis direction, and a lens drive mechanism that causes the lens holding member to move forward or backward in the optical axis direction, wherein the guide portion of the lens holding member is possible to be moved to a position that passes over a plane including an opening/closing operation area of the barrier member.

According to the first aspect of the present invention, the guide portion of the lens holding member is possible to be moved to a position that passes over a plane including an opening/closing operation area of the barrier member, and therefore, it is possible to shorten the length (collapsed length) of the lens barrel in the collapsed position.

Preferably, the lens barrel further comprises a guide portion that has a guide function and a function of preventing the lens holding member from rotating.

More preferably, the guide portion of the lens holding member is formed integrally with the lens holding member.

According to the just-mentioned configuration, the guide portion of the lens holding member is formed into one piece with the lens holding member, and therefore, it is easy to secure the required parallelism between the optical axis of the image-taking lens held by the lens holding member and the axial center line of the guide portion, thereby making it possible to realize a high accuracy focus mechanism.

Preferably, the lens barrel is configured to be capable of advancing and receding between a collapsed position and an image-taking position thereof in the optical axis direction.

In order to attain the above described object, according to a second aspect of the present invention, there is provided an image-pickup apparatus comprising a lens barrel according to the first aspect of this invention.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing a preferred embodiment thereof.

Figure 1:
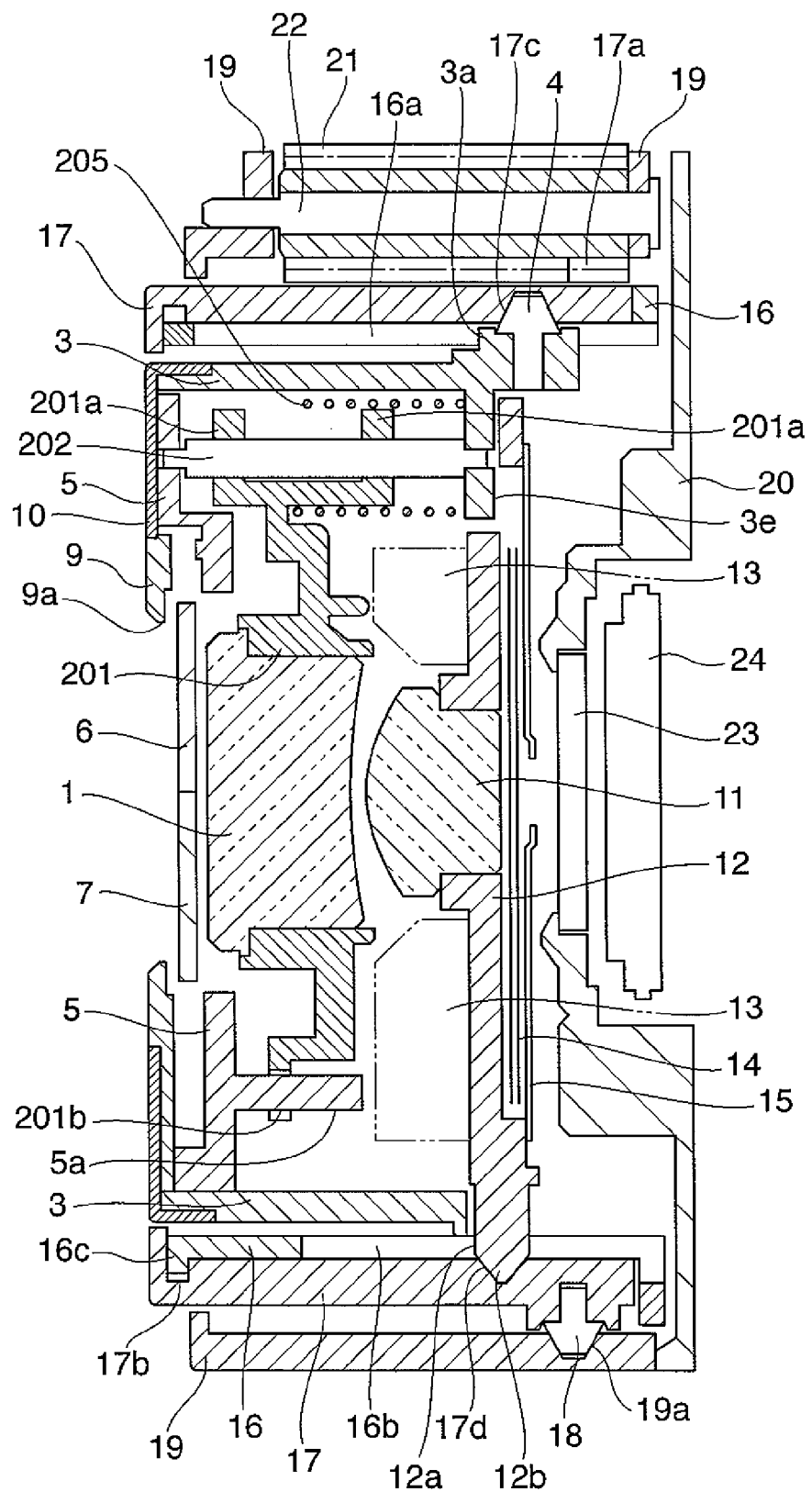
FIG. 1 is a sectional view showing a lens barrel in a collapsed position according to an embodiment of the present invention.
Figure 2:
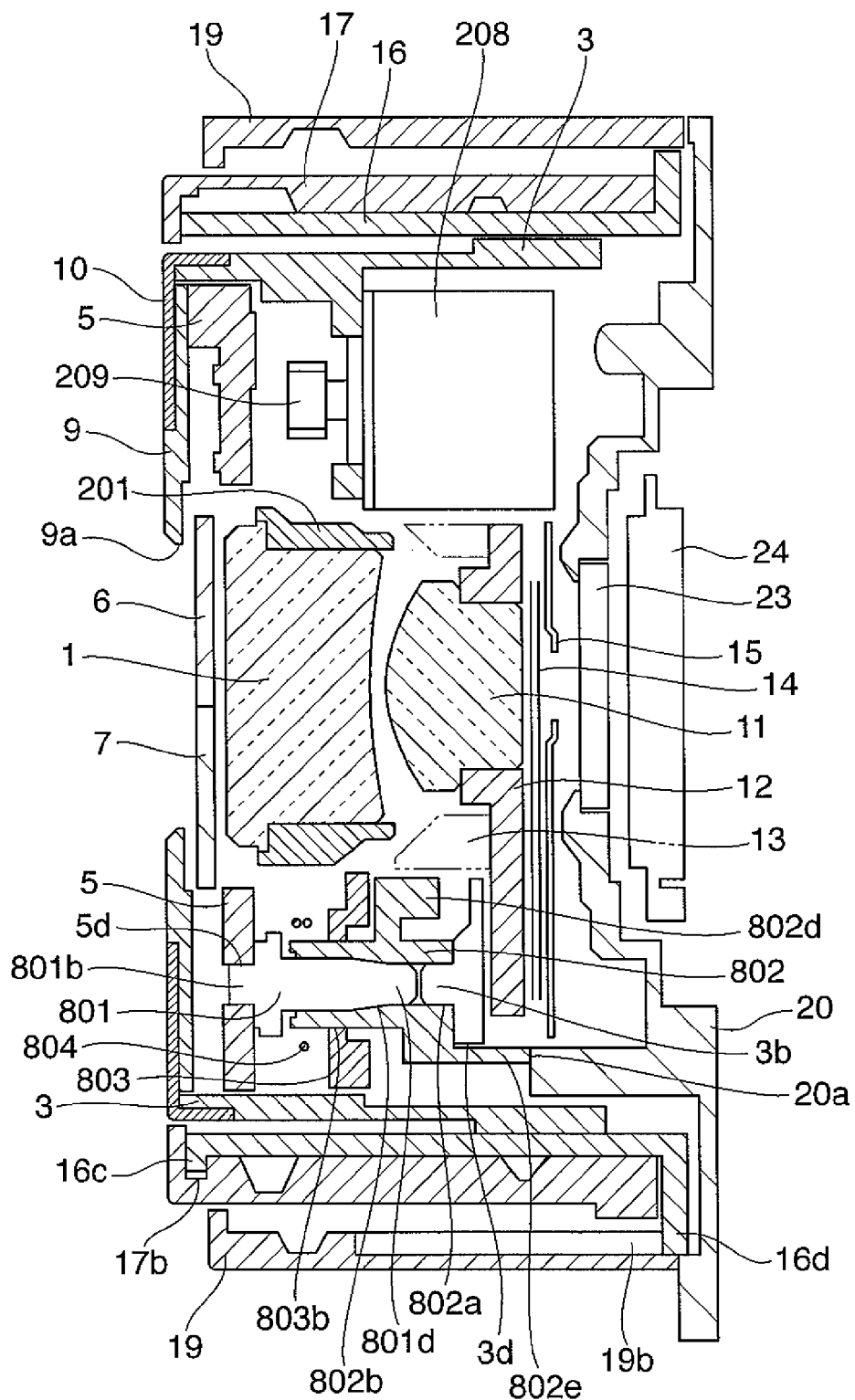
FIG. 2 is a sectional view showing, in a different section, the lens barrel which is in the collapsed position.
Figure 3:
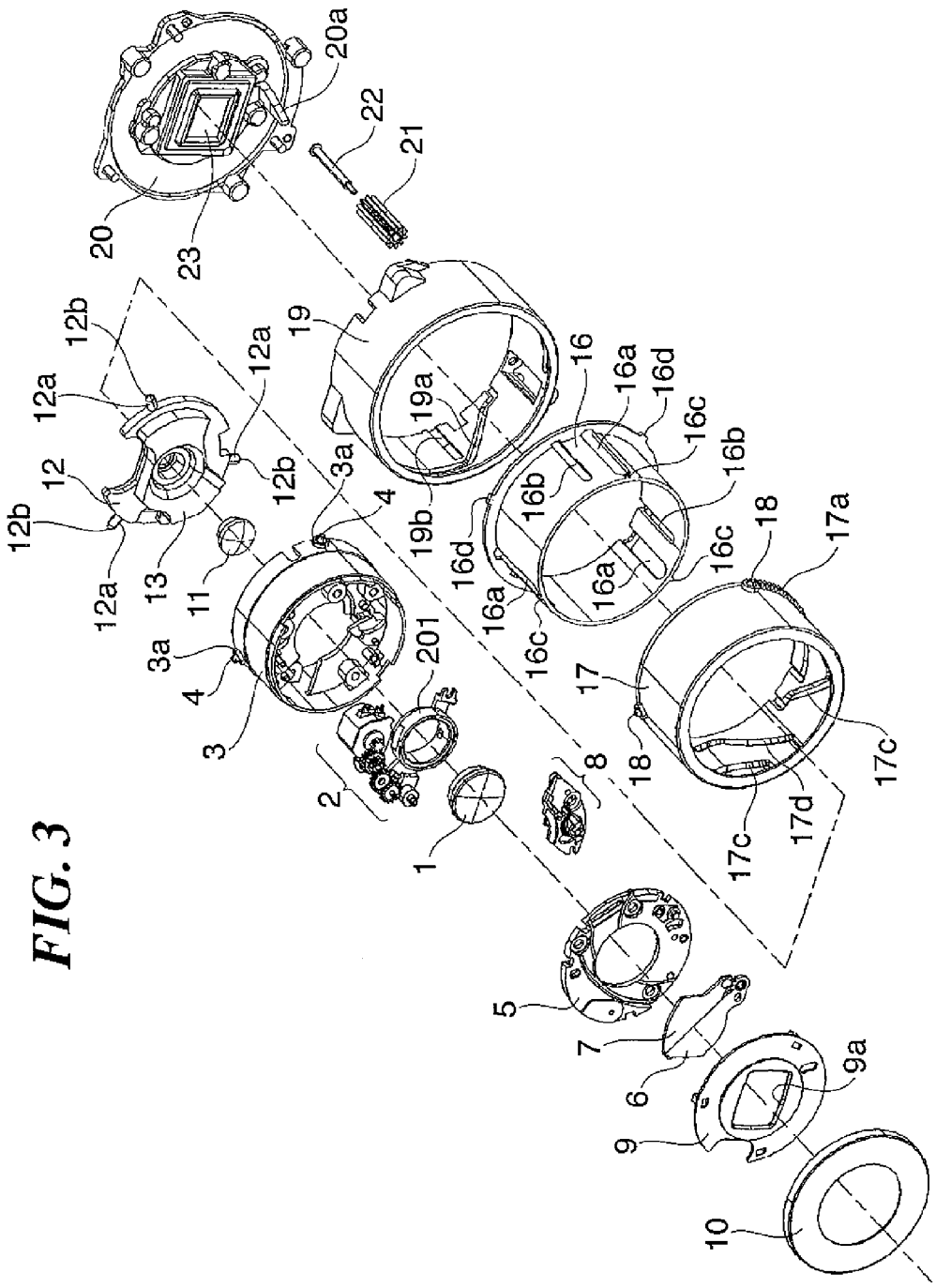
FIG. 3 is an exploded perspective view showing the overall configuration of the lens barrel.

FIG. 1 is a sectional view showing a lens barrel in a collapsed position according to an embodiment of the present invention. FIG. 2 is a sectional view showing, in a different section, the lens barrel which is in the collapsed position. FIG. 3 is an exploded perspective view showing the overall configuration of the lens barrel.

Referring to FIGS. 1 to 3, the lens barrel is comprised of a first lens group 1, a lens group driving unit 2, a forward/backward moving cylinder 3, a first base plate member 5, barrier members 6, 7, a barrier driving unit 8, a second lens group 11, a second lens holding member 12, a rectilinearly moving cylinder 16, a cam cylinder 17, a fixed cylinder 19, a fixed base plate member 20, and the like.

The lens barrel is constructed to be capable of advancing and receding in the optical axis direction between a collapsed position and an image-taking position thereof. The lens group driving unit (focus driving unit) 2 includes a first lens holding member 201 that holds the first lens group 1, and performs a focus operation to move the first lens group 1 in the optical axis direction. The forward/backward moving cylinder 3 is provided at the outer periphery thereof with convex parts 3a for preventing rotation of the forward/backward moving cylinder, and is further provided with a positioning portion 3e. The lens group driving unit 2 is mounted to the inner periphery of the forward/backward moving cylinder 3, and cam followers 4 are press-fitted and fixed to the outer periphery of the forward/backward moving cylinder 3. The first base plate member 5 is formed integrally with a guide shaft portion 5a that engages with a sub guide portion 201b (which will be described later) of the first lens holding member 201, and is attached to the inner periphery of the forward/backward moving cylinder 3.

The barrier members 6, 7 are for protecting the first lens group 1 and are attached to the first base plate member 5 so as to be pivotable in a direction crossing the optical axis direction. The barrier driving unit 8 for opening/closing the barrier members 6, 7 is fixedly attached to the forward/backward moving cylinder 3 and the first base plate member 5. A cover member 9 covers the front side of the barrier members 6, 7 and is provided with an opening 9a disposed on the front side of the lens barrel. A cap member 10 covers the front side of the cover member 9.

The second lens holding member 12 for holding the second lens group 11 is provided at the outer periphery thereof with a plurality of convex parts 12a and cam follower portions 12b. A shutter drive mechanism unit 13 is attached to the second lens holding member 12 and opens/closes a diaphragm/shutter member 14. The diaphragm/shutter member 14 is attached to the second lens holding member 12 and is opened and closed by the shutter drive mechanism unit 13. A cover member 15 covers the diaphragm/shutter member 14.

The rectilinearly moving cylinder 16 is generally cylindrical in shape, is disposed outside the forward/backward moving cylinder 3 and the second lens holding member 12, and is provided with rectilinearly moving guide grooves 16a, 16b and convex parts 16c, 16d. The rectilinearly moving guide grooves 16a and 16b extend in the optical axis direction from the outer periphery to the inner periphery of the rectilinearly moving cylinder 16 for engagement with convex parts 3a of the forward/backward moving cylinder 3 and the convex parts 12a of the second lens holding member 12, respectively. The convex parts 16c and 16d are disposed on the outer periphery of the forward/backward moving cylinder 3.

The cam cylinder 17 is generally cylindrical in shape, is disposed outside the rectilinearly moving cylinder 16, and is provided with a gear portion 17a, grooves 17b, and cam portions 17c, 17d. The gear portion 17a is disposed on the outer periphery of the cam cylinder 17 for engagement with a gear member 21. The grooves 17b are formed in the inner periphery concentrically to the outer peripheral surface of the cam cylinder 17 for engagement with the convex parts 16c of the rectilinearly moving cylinder 16. Thus, the cam cylinder 17 and the rectilinearly moving cylinder 16 are relatively rotatable. The cam portions 17c, 17d are cam-coupled with the cam followers 4 of the forward/backward moving cylinder 3 and the cam follower portions 12b of the second lens holding member 12, respectively. Cam followers 18 are press-fitted and fixed to the outer periphery of the cam cylinder 17.

The fixed cylinder 19 is generally cylindrical in shape, is disposed outside the cam cylinder 17, and is provided with cam portions 19a and rectilinearly moving guide grooves 19b. The cam portions 19a are disposed in the inner periphery of the fixed cylinder 19 and cam-coupled with the cam followers 18 of the cam cylinder 17. The rectilinearly moving guide grooves 19b are formed in the inner periphery of the fixed cylinder 19 for engagement with the convex parts 16d of the forward moving cylinder 16. The fixed base plate member 20 is fixed to an end face of the fixed cylinder 19 using screws and is provided with a barrier cam portion 20a that causes the barrier members 6, 7 to open and close. The fixed base plate member 20 is fixed to a camera main body (not shown).

The gear member 21 is engaged with the gear portion 17a of the cam cylinder 17, is provided with a shaft hole into which a rotation shaft member 22 is press-fitted and fixed, and is driven to rotate by a drive source (not shown). The rotation shaft member 22 supports the gear member 21 by being fixed to the shaft hole of the gear member 21, and is fixed to the fixed cylinder 19. An optical member 23 is attached to the fixed base plate member 20. A CCD 24 serving as an image-pickup element is fixed and wired to the fixed base plate member 20 using a predetermined fixing method, and has a focusing surface (light-receiving surface) thereof on which an optical image of an object is formed through the optical member 23.

Figure 4:
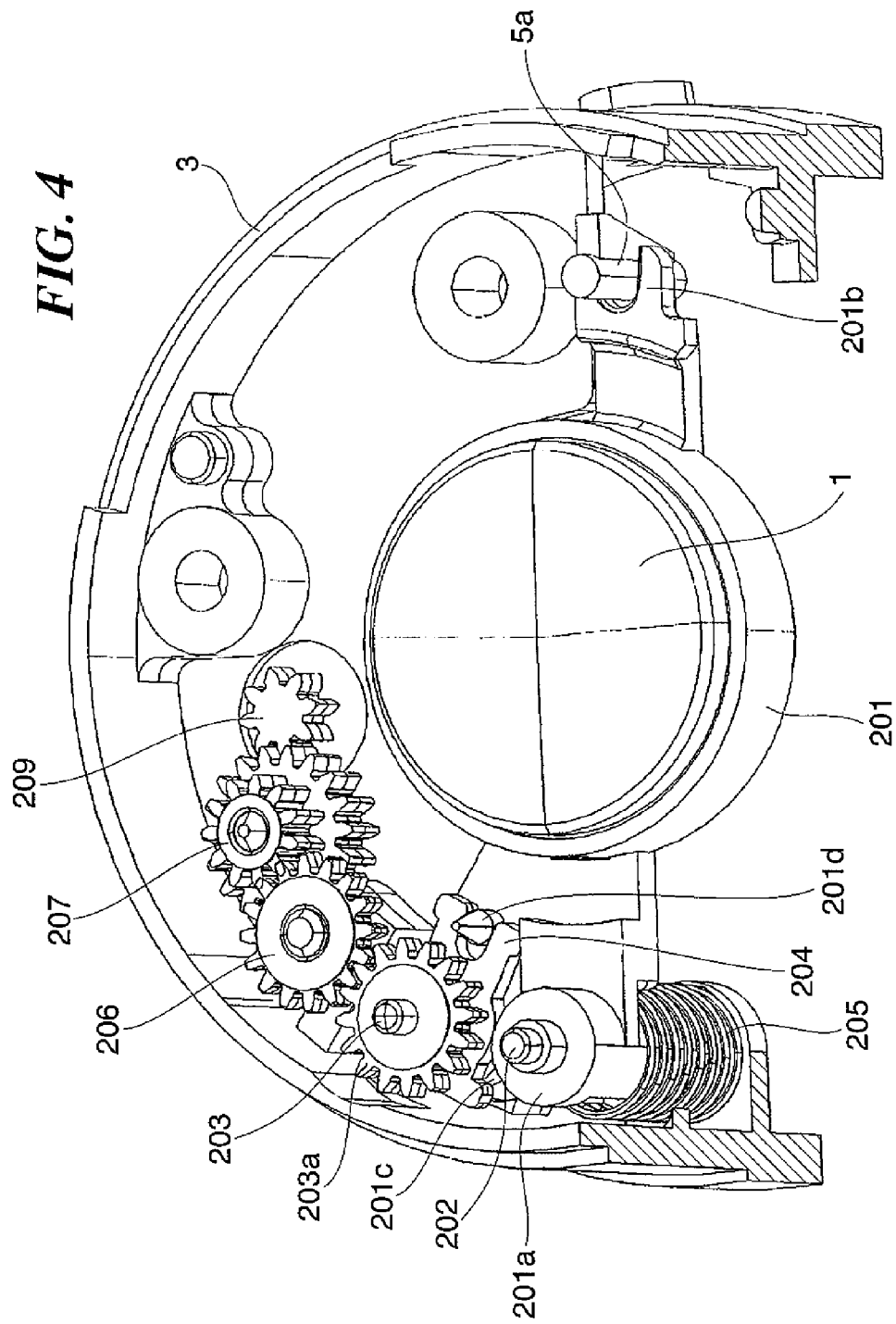
FIG. 4 is a perspective view showing a lens group driving unit attached to a forward/backward moving cylinder.
Figure 5:
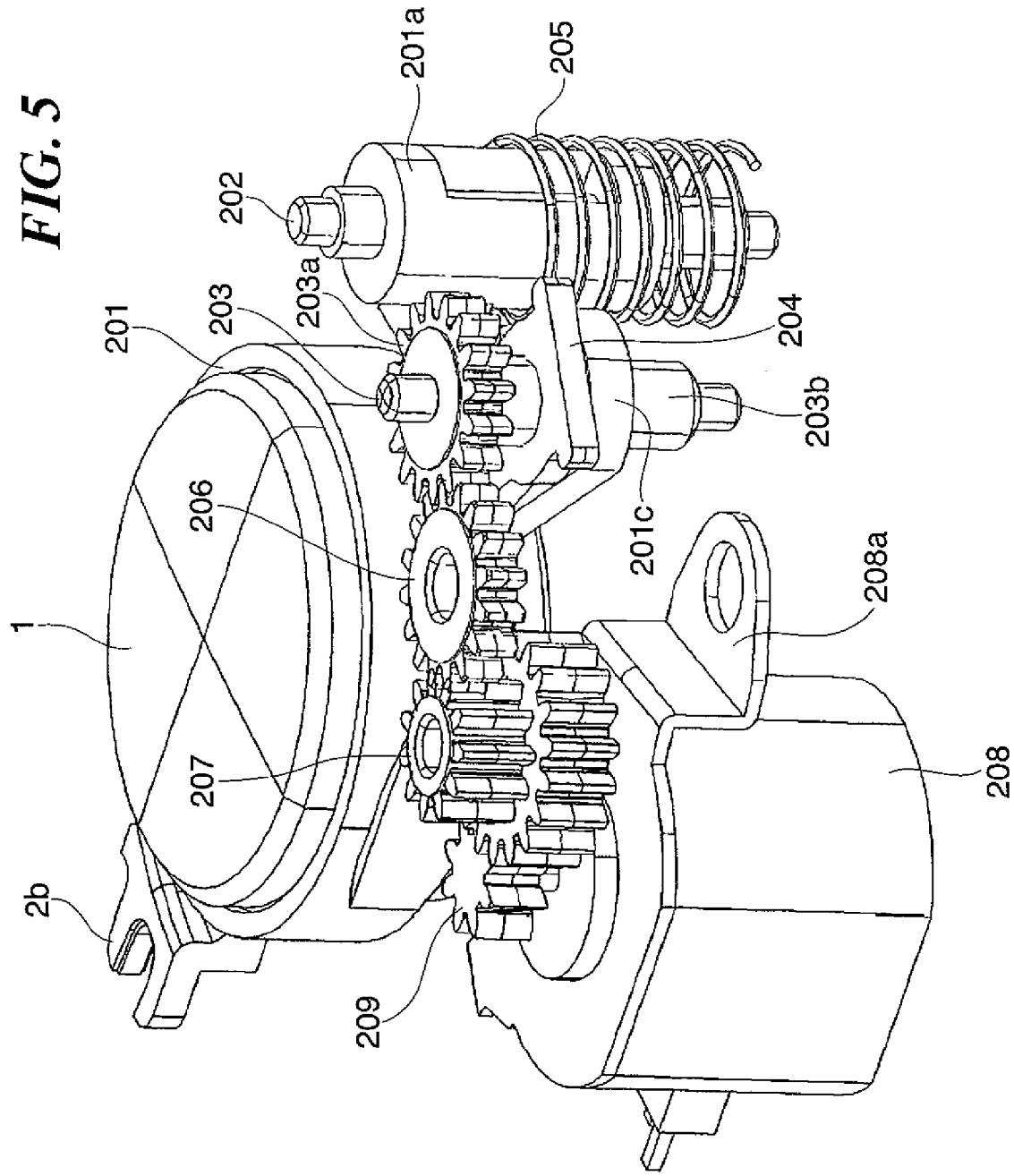
FIG. 5 is a perspective view of the lens group driving unit as seen from a different direction.

FIG. 4 is a perspective view showing the lens group driving unit 2 mounted in the forward/backward moving cylinder 3. FIG. 5 is a perspective view of the lens group driving unit 2 as seen from a different direction.

In FIGS. 4 and 5, the forward/backward moving cylinder 3 is shown partly cut away, and the base plate member 5 is shown only partly (guide shaft portion 5a). In addition to the aforementioned first lens holding member 201, the lens group driving unit 2 includes a guide member 202, a screw member 203, a nut member 204, a spring member 205, a gear member 206, a stepped gear member 207, a stepping motor 208, and a gear member 209.

The first lens holding member 201 is comprised of a main body (holding portion) that holds the first lens group 1, a main guide portion 201a, a sub guide portion 201b, a bracket portion 201c, and a whirl stop portion 201d. The main guide portion 201a is formed integrally with the first lens holding member 201, is formed with a hole into which the guide member 202 is engaged (inserted), and has a guide function of guiding the movement of the first lens group 1 in the optical axis direction. The sub guide portion 201b is engaged with the guide shaft portion 5a formed integrally with the first base plate member 5, and has a guide function and a function of preventing rotation (oscillation) of the first lens holding member 201.

The guide member 202 is engaged with the hole of the main guide portion 201a of the first lens holding member 201, and guides the movement of the first lens holding member 201 in the optical axis direction. The guide member 202 is positioned by the positioning portion 3e (see FIG. 7) of the forward/backward moving cylinder 3 and a positioning portion 5g of the first base plate member 5 (see FIG. 9), and is attached to the first lens holding member 201. The screw member 203 is comprised of a gear portion 203a and a screw portion 203b. The nut member 204 is screw-connected to the screw portion 203b of the screw member 203 and is attached to the bracket portion 201c of the first lens holding member 201 and rotation thereof is prevented by the whirl stop portion 201d of the first lens holding member 201.

The spring member 205 is disposed around the outer periphery of the main guide portion 201a of the first lens holding member 201, and urges the first lens holding member 201 and the nut member 204 toward the screw portion 203b of the screw member 203. The gear member 206 is in mesh with the gear portion 203a of the screw member 203. The stepped gear member 207 is in mesh with the gear member 206. The stepping motor 208 is attached to the forward/backward moving cylinder 3 through a mounting portion 208a, and generates a drive force to cause the first lens holding member 201 to move either forward or backward in the optical axis direction. The gear member 209 is press-fitted and fixed to the stepping motor 208 and is in mesh with the stepped gear member 207.

Figure 6:
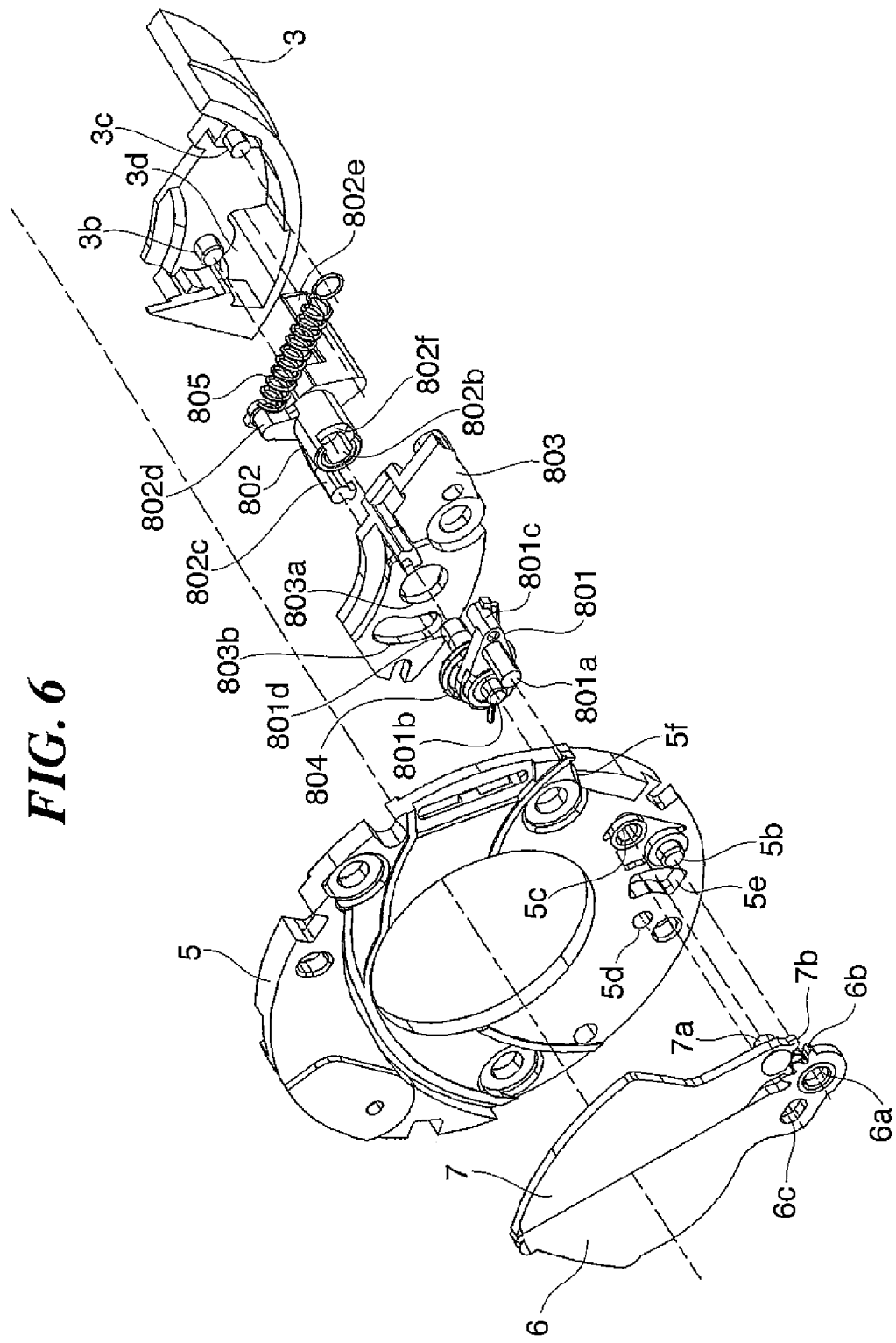
FIG. 6 is an exploded perspective view showing the configuration of the barrier driving unit in detail.

FIG. 6 is an exploded perspective view showing the configuration of the barrier driving unit 8 in detail.

In FIG. 6, the forward/backward moving cylinder 3 is shown party cut away. The forward/backward moving cylinder 3 is provided with a convex part 3a, a shaft portion 3b, a convex part 3c, and a hole 3d. In addition to the aforementioned guide shaft portion 5a, the first base plate member 5 is provided with a shaft portion 5b, holes 5c, 5d, an elongated hole 5e, and a convex part 5f (see FIG. 1). The barrier member 6 is provided with a hole 6a, a gear portion 6b, and an elongated hole 6c. The barrier member 7 is comprised of a shaft portion 7a and a gear portion 7b.

The shaft portion 5b of the first base plate member 5 is inserted into the hole 6a of the barrier member 6, whereby the barrier member 6 is attached to the first base plate member 5 for pivotal movement in a plane thereof and the gear portion 6b is in mesh with the gear portion 7b of the barrier member 7. The shaft portion 7a of the barrier member 7 is inserted into the hole 5c of the first base plate member 5, whereby the barrier member 7 is attached to the first base plate member 5 for pivotal movement in a plane thereof and the gear portion 7b is in mesh with the gear portion 6b of the barrier member 6.

A first barrier drive member 801 is comprised of a convex part 801a, a shaft portion 801b, a spring hook portion 801c, a stepped shaft portion 801d, and a convex part 801e. The convex part 801a extends through the elongated hole 5e of the first base plate member 5 and is coupled to the elongated hole 6c of the barrier member 6. The shaft portion 801b is engaged with the hole 5d of the first base plate member 5 so as to be rotatable therein, and is disposed on the outer periphery side of the first lens group 1 in parallel to the optical axis.

A second barrier drive member 802 is comprised of inner diameter portions 802a, 802b, spring hook portions 802c, 802d, a lever arm portion 802e, and a notch portion 802f. The second barrier drive member 802 is disposed coaxially with the first barrier drive member 801. The inner diameter portion 802a rotatably supports the shaft portion 3b of the forward/backward moving cylinder 3. The inner diameter portion 802b rotatably supports the stepped shaft portion 801d of the first barrier drive member 801. The lever arm portion 802e, which is disposed to extend through the hole 3d of the forward/backward moving cylinder 3, is disengaged from or engaged with the barrier cam portion 20a of the fixed base plate member 20 in response to the barrier opening/closing operation.

A second base plate member 803 is formed with holes 803a and 803b. By being engaged with a cylindrical part of the second barrier drive member 802, the hole 803a rotatably supports the second barrier drive member 802. The spring hook portion 802c of the second barrier drive member 802 extends through the hole 803b.

A first spring member 804 is disposed on the outside diameter side of the second barrier drive member 802 coaxially with the first and second barrier drive members 801 802, and is attached to the spring hook portion 801c of the first barrier drive member 801 and the spring hook portion 802c of the second barrier drive member 802. The first and second barrier drive members 801, 802 are coupled together through the first spring member 804.

A second spring member 805 is attached to the spring hook portion 802d of the second barrier drive member 802 and to the convex part 3c of the forward/backward moving cylinder 3. The second spring member 805 urges the first and second barrier drive members 801 and 802 in the clockwise direction (barrier opening direction), which are coupled together through the first spring member 804.

In the first and second barrier drive members 801 and 802 coupled together through the first spring member 804, a convex part (not shown) of the first barrier drive member 801 is fitted into the notch portion 802f of the second barrier drive member 802. The first and second barrier drive members 801 and 802 are thus relatively rotatable by an angle corresponding to a circumferential length of the notch portion 802f, only when a force is applied in a direction in which the first spring member 804 is charged.

Next, various operations of the lens barrel of this embodiment configured as described above will be explained in detail with reference to FIGS. 7 to 15.

First, an explanation will be given of the advancing/receding movement of the lens barrel (lens barrel members) in the optical axis direction.

Figure 7:
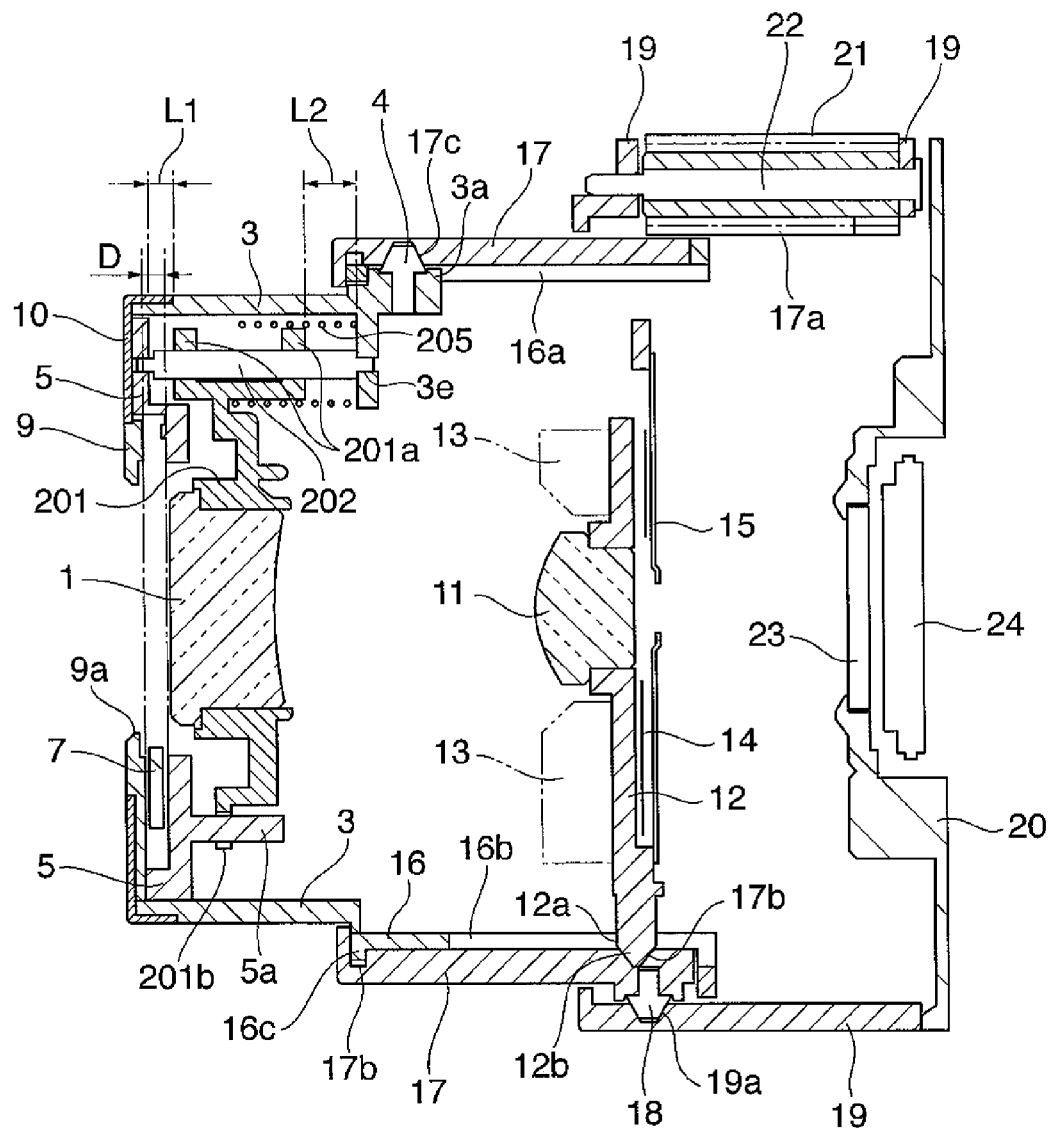
FIG. 7 is a sectional view showing the lens barrel which is in an image-taking position (WIDE position)
Figure 8:
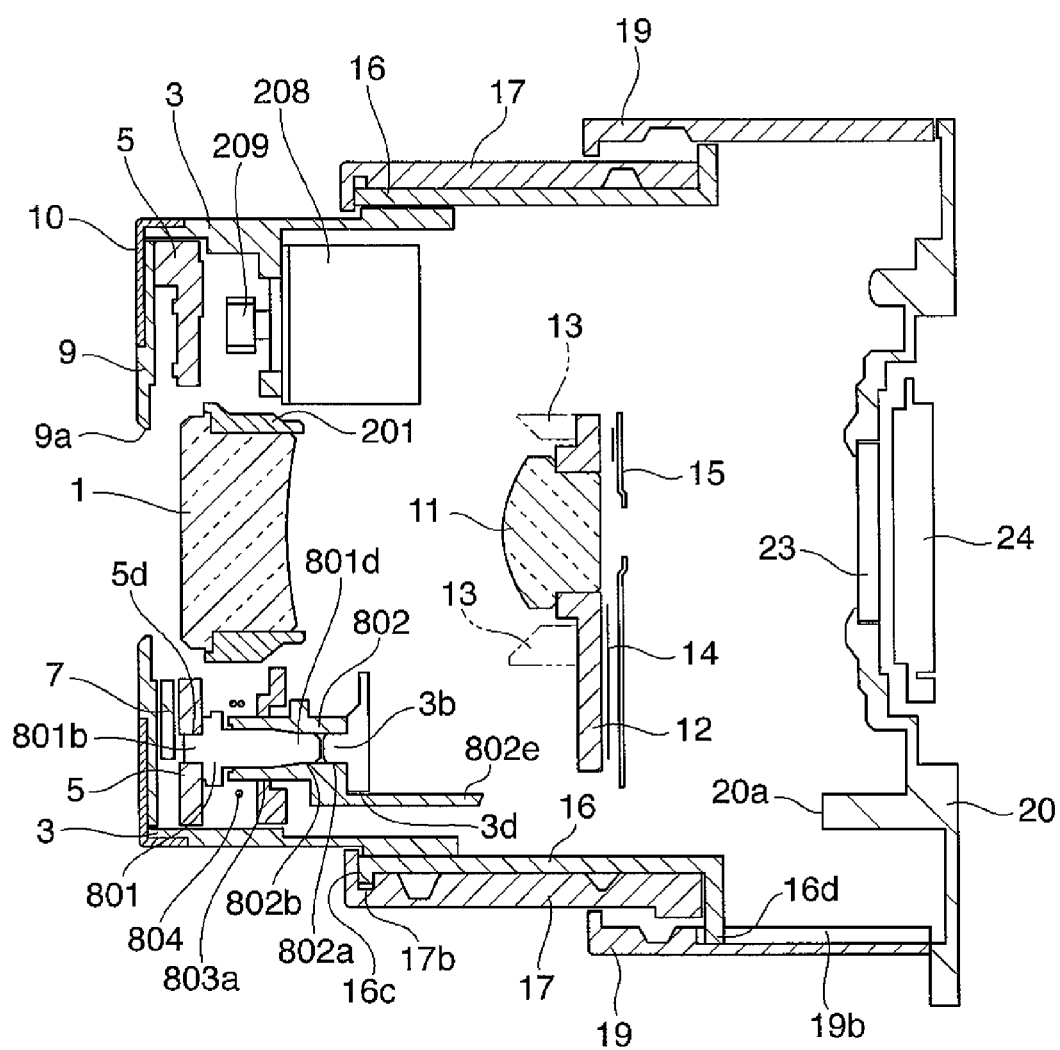
FIG. 8 is a sectional view showing, in a different section, the lens barrel which is in the image-taking position (WIDE position)
Figure 9:
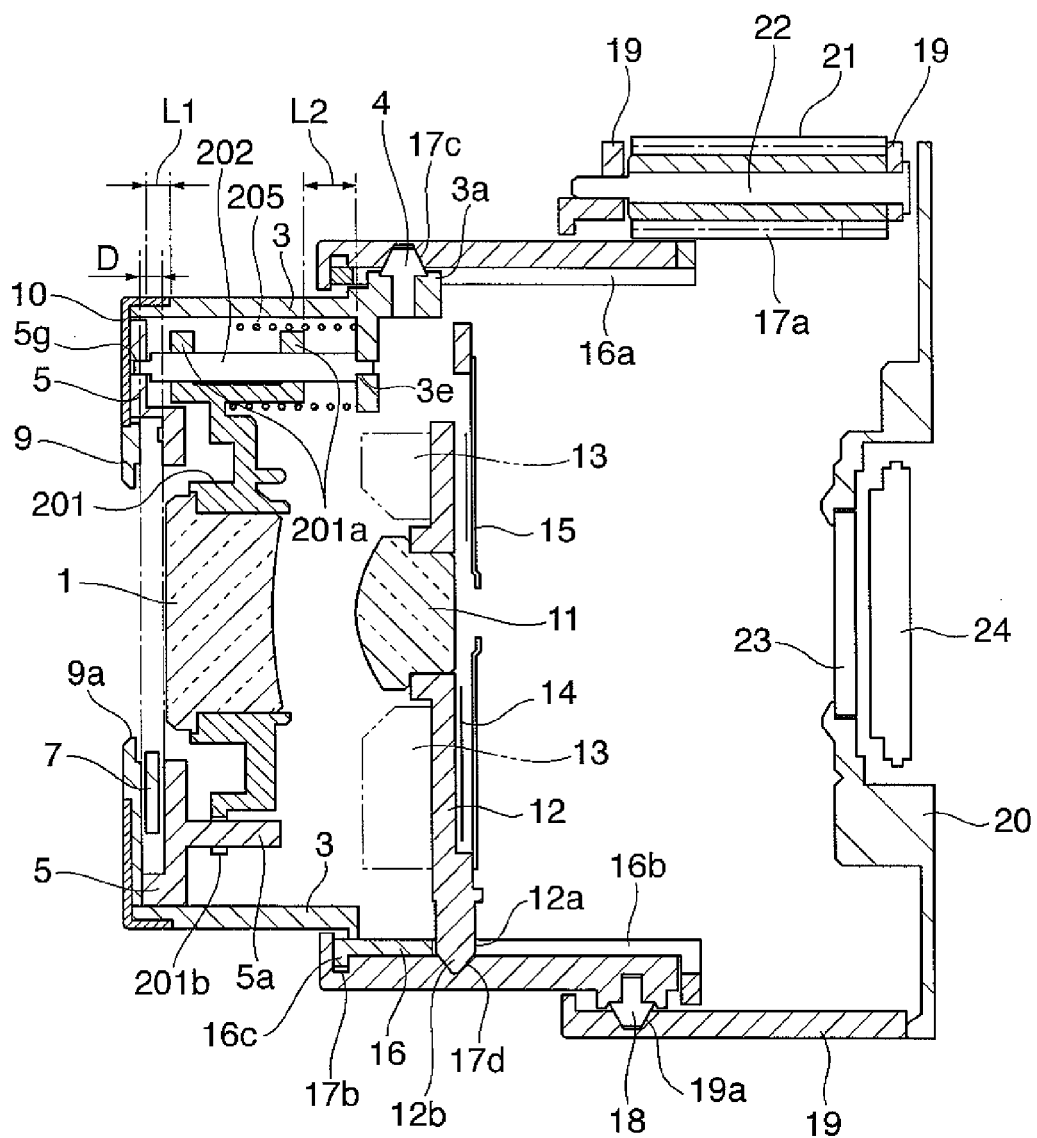
FIG. 9 is a sectional view showing the lens barrel which is in another image-taking position (TELE position)
Figure 10:
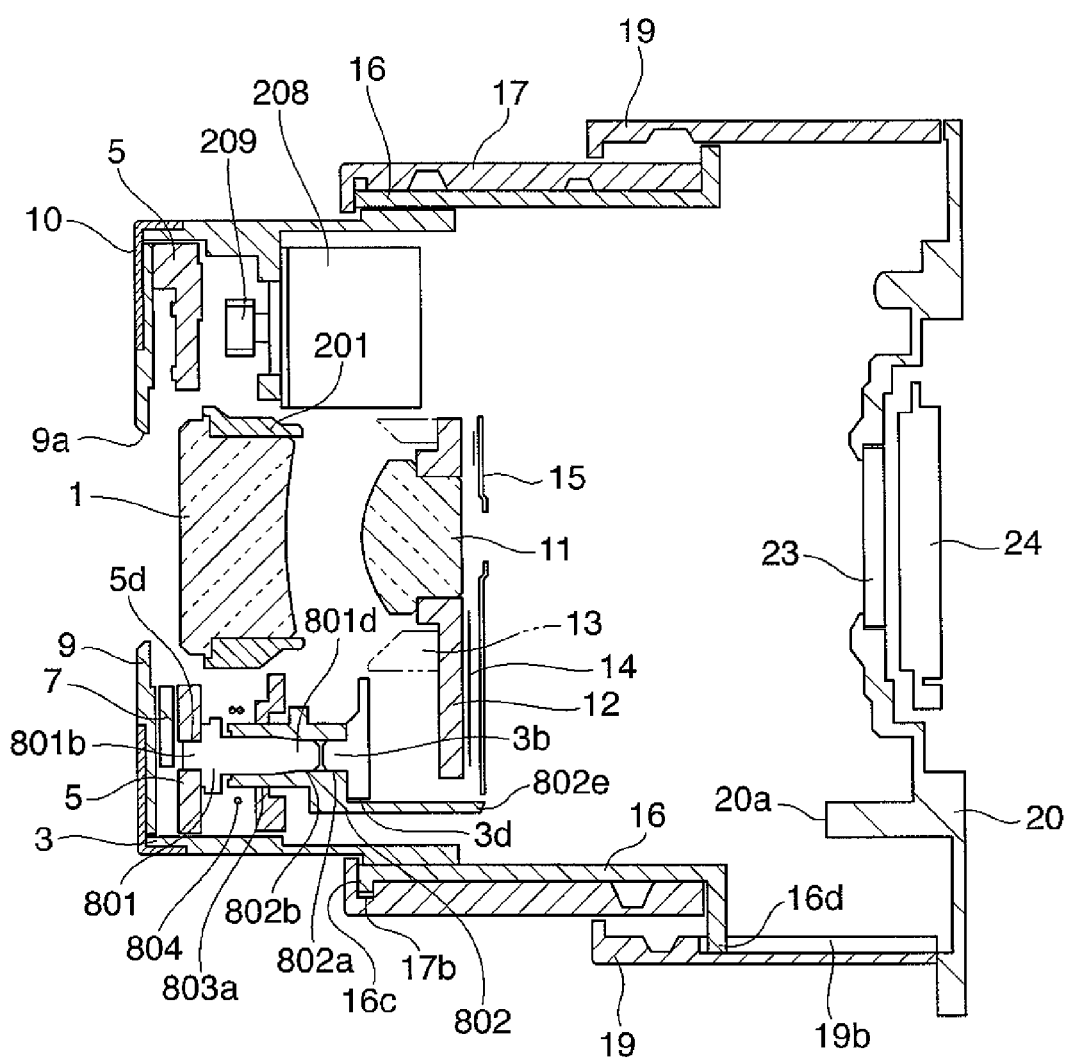
FIG. 10 is sectional view showing, in a different section, the lens barrel which is in the image-taking position (TELE position)

FIG. 7 is a sectional view showing the lens barrel which is in an image-taking position (WIDE position). FIG. 8 is a sectional view showing, in a different section, the lens barrel which is in the image-taking position (WIDE position). FIG. 9 is a sectional view showing the lens barrel which is in another image-taking position (TELE position). FIG. 10 is a sectional view showing, in a different section, the lens barrel which is in the image-taking position (TELE position).

In FIGS. 7 to 10, when the gear member 21 is rotated by a drive source (not shown), the cam cylinder 17 rotates and moves either forward or backward in the optical axis direction because the gear member 21 is in mesh with the gear portion 17a of the cam cylinder 17. Because of the cam follower 18 of the cam cylinder 17 and the cam portion 19a of the fixed cylinder 19 being cam-coupled together, the cam cylinder 17 moves back and forth in the optical axis direction along a cam locus (not shown). At this time, the rectilinearly moving cylinder 16 moves either forward or backward in the optical axis direction in unison with the cam cylinder 17 due to the engagement of the convex parts 16c and the grooves 17b of the cam cylinder 17, while being prevented from rotating around the optical axis due to the engagement between the convex parts 16d and rectilinearly moving guide grooves 19b of the fixed cylinder 19.

When the cam cylinder 17 rotates, the forward/backward moving cylinder 3 moves either forward or backward in the optical axis direction along a cam locus (not shown) due to the engagement between the cam followers 4 and convex parts 16c of the rectilinearly moving cylinder 16, while being prevented from rotating around the optical axis due to the engagement between the convex parts 3a and the rectilinearly moving guide grooves 16a of the rectilinearly moving cylinder 16. Likewise, the second lens holding member 12 moves forward or backward in the optical axis direction along a cam locus (not shown) due to the engagement between the cam follower portions 12b and cam portions 17d of the cam cylinder 17, while being prevented from rotating around the optical axis due to the engagement between the convex parts 12a and the rectilinearly moving guide grooves 16b of the rectilinearly moving cylinder 16.

As a result, the lens barrel is caused to move from the collapsed position (FIGS. 1 and 2) to the WIDE (Wide Angle: wide angle side) position which is one of image-taking positions (FIGS. 7 and 8). Furthermore, the lens barrel performs a zooming operation from the WIDE position to TELE (Telescope: telephoto side) position which is another image-taking position (FIGS. 9 and 10).

Next, the focus operation of the lens barrel will be explained.

When electric power is supplied in a predetermined power supply pattern through wiring (not shown) to the stepping motor 208 of the lens group driving unit 2, the gear member 209 rotates in a predetermined direction and the torque thereof is transmitted to the stepped gear member 207 to the gear member 206 and to the gear portion 203a, causing the screw member 203 to rotate. When the screw member 203 rotates, the torque thereof is transmitted to the nut member 204. Since the nut member 204 and the first lens holding member 201 are urged toward the screw portion 203b of the screw member 203 by the spring member 205, they move together either forward or backward in the optical axis direction.

In this way, a focus operation is performed in which the lens group driving unit 2 moves the first lens group 1 in position in the optical axis direction. In this embodiment, a focus operation is performed only when the lens barrel is in any of the image-taking positions. The sum L1+L2 of an object-side focus stroke area L1 and a CCD-side focus stroke area L2 of the main guide portion 201a shown in FIGS. 7 and 9 corresponds to a movement stroke (focus stroke) of the first lens group 1. In FIGS. 7 and 9, symbol D denotes the opening/closing operation plane of the barrier members 6, 7.

According to this embodiment, the object-side focus stroke area L1 of the main guide portion 201a of the first lens holding member 201 is made overlap the opening/closing operation plane D of the barrier members 6, 7, as viewed in the optical axis direction.

Figure 16:
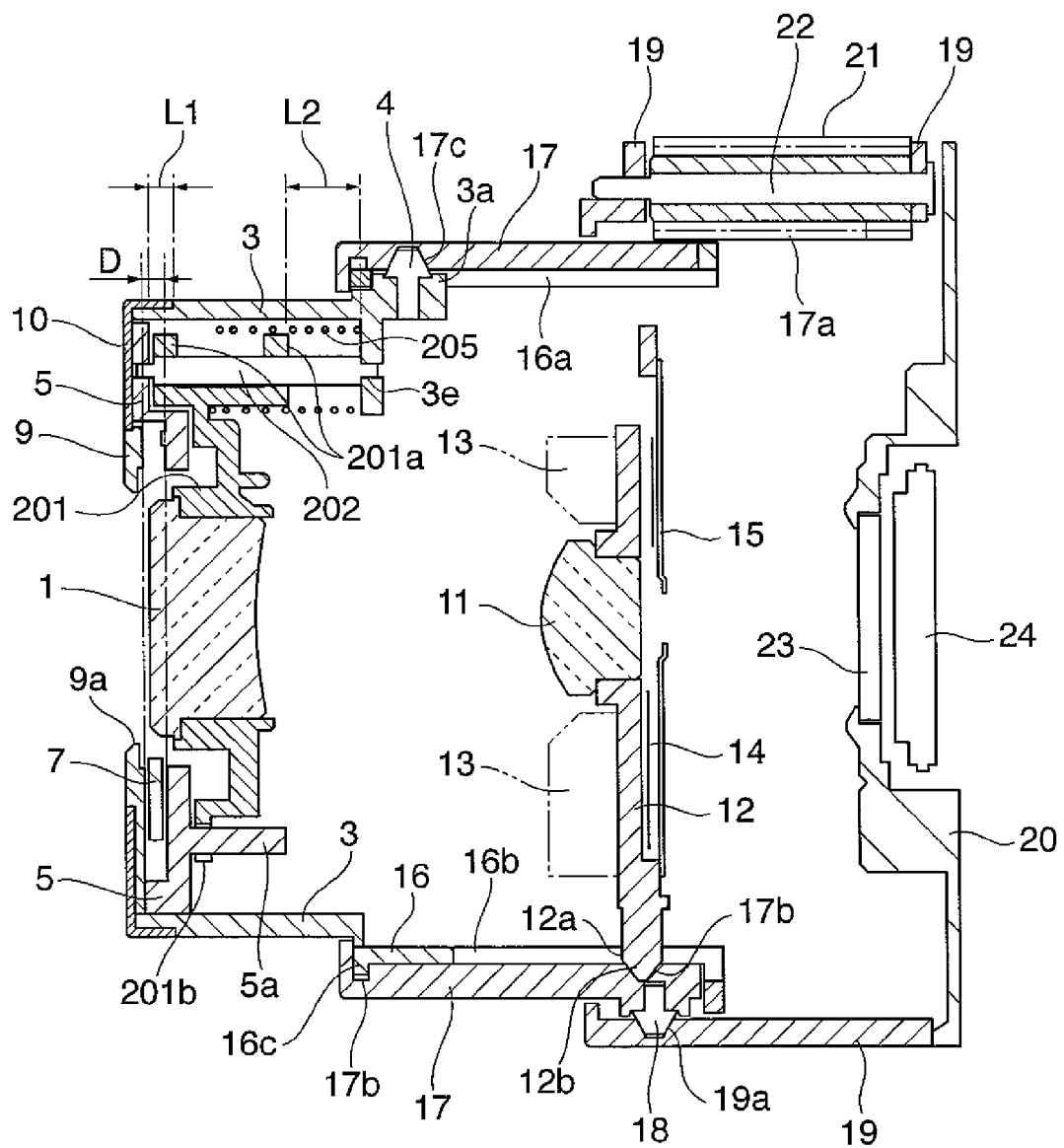
FIG. 16 is a view showing main guide portion in a state where it is moved to an opening/closing operation plane.

FIG. 16 shows the main guide portion 201a of the first lens holding member 201 in a state where it is moved to the opening/closing operation plane D of the barrier members 6 and 7. Since the barrier members 6 and 7 are in an open state, the first lens group is also moved to the opening/closing operation plane D of the barrier members 6 and 7. With this arrangement, the camera can be made compact while securing the stroke region L1+L2.

Next, the barrier opening/closing operation of the lens barrel will be explained.

Figure 11:
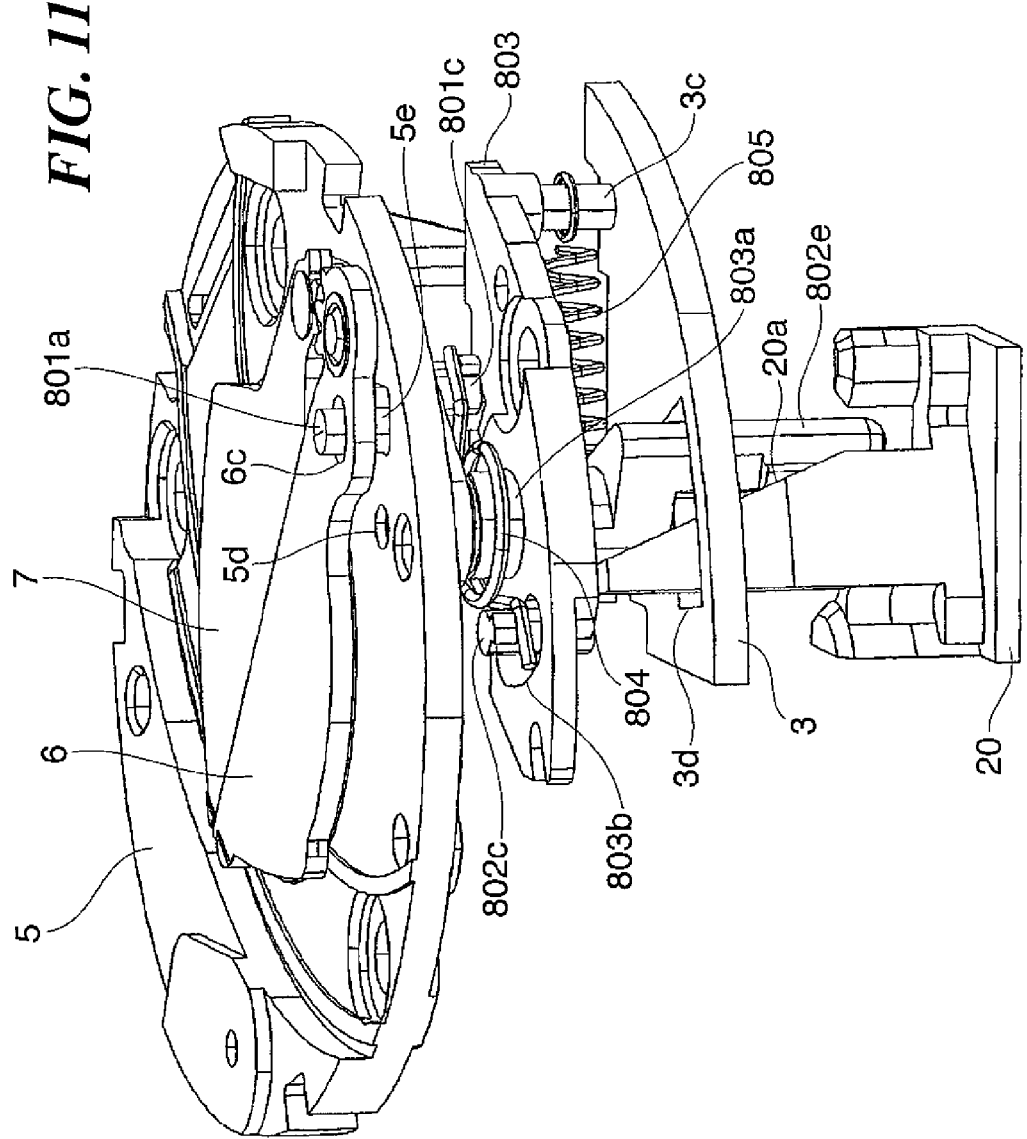
FIG. 11 is a perspective view showing the barrier driving unit which is in a barrier closed position.
Figure 12:
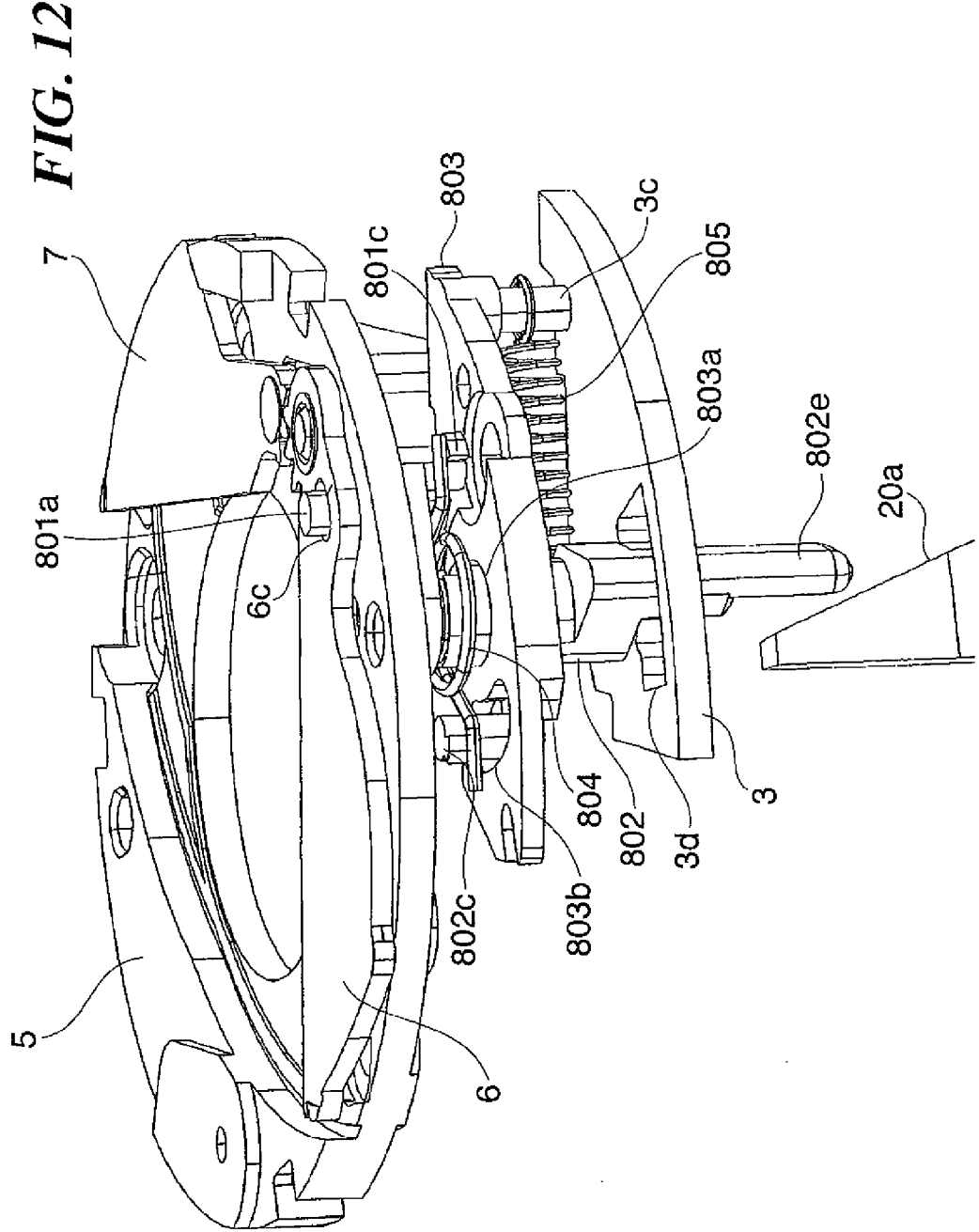
FIG. 12 is a perspective view showing the barrier driving unit in a barrier open position.
Figure 13:
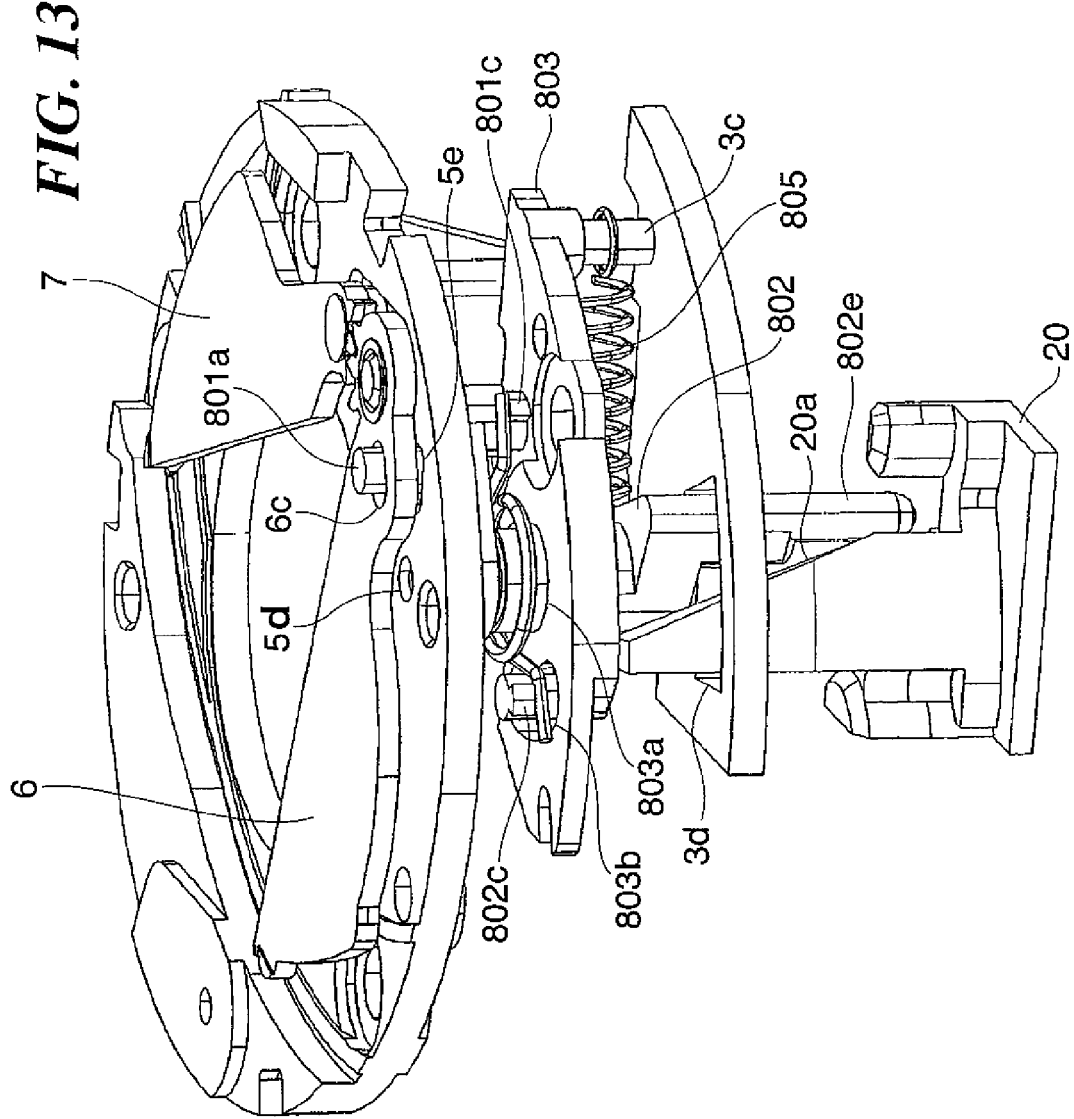
FIG. 13 is a perspective view showing the barrier driving unit when an external force is applied in a direction of opening the barrier member.
Figure 14:
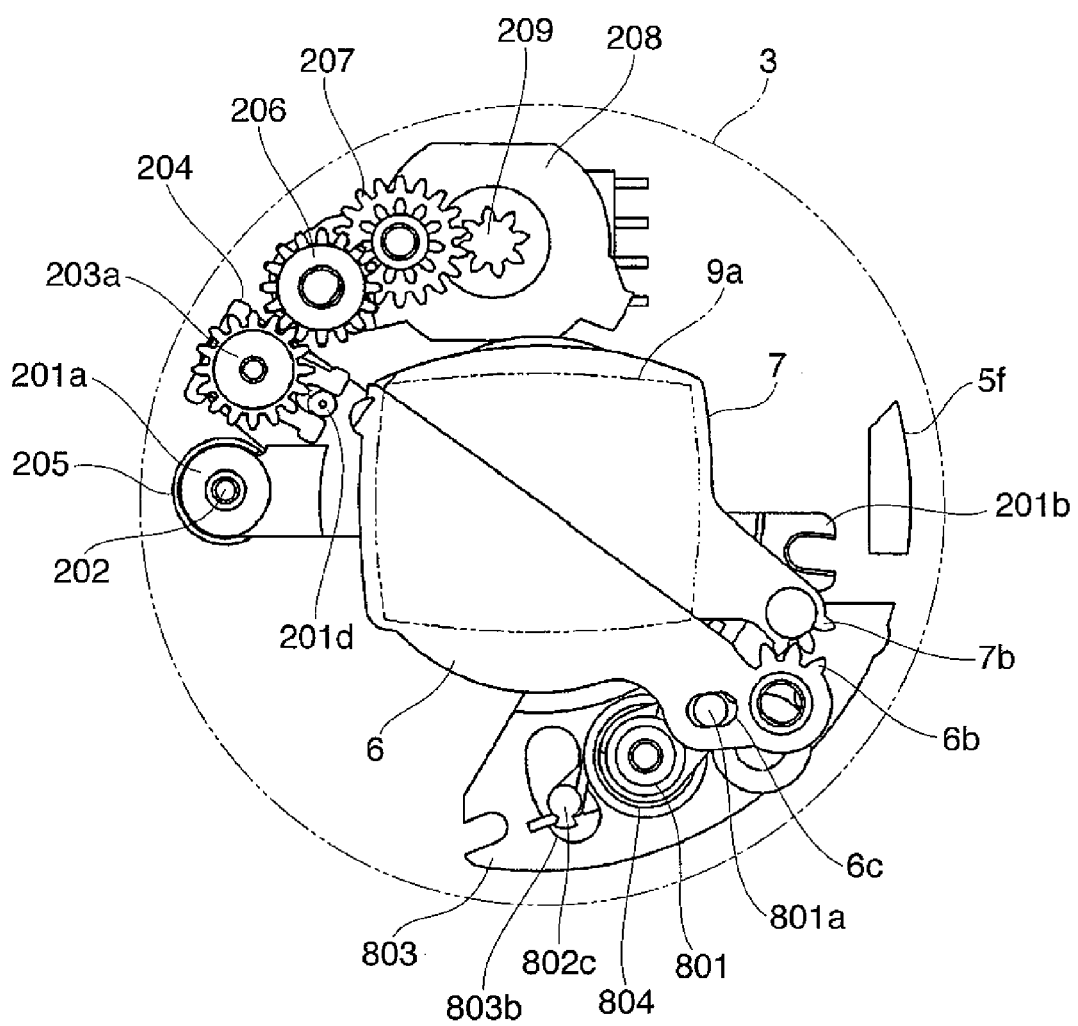
FIG. 14 is a front view showing the barrier driving unit in a barrier closed position.
Figure 15:
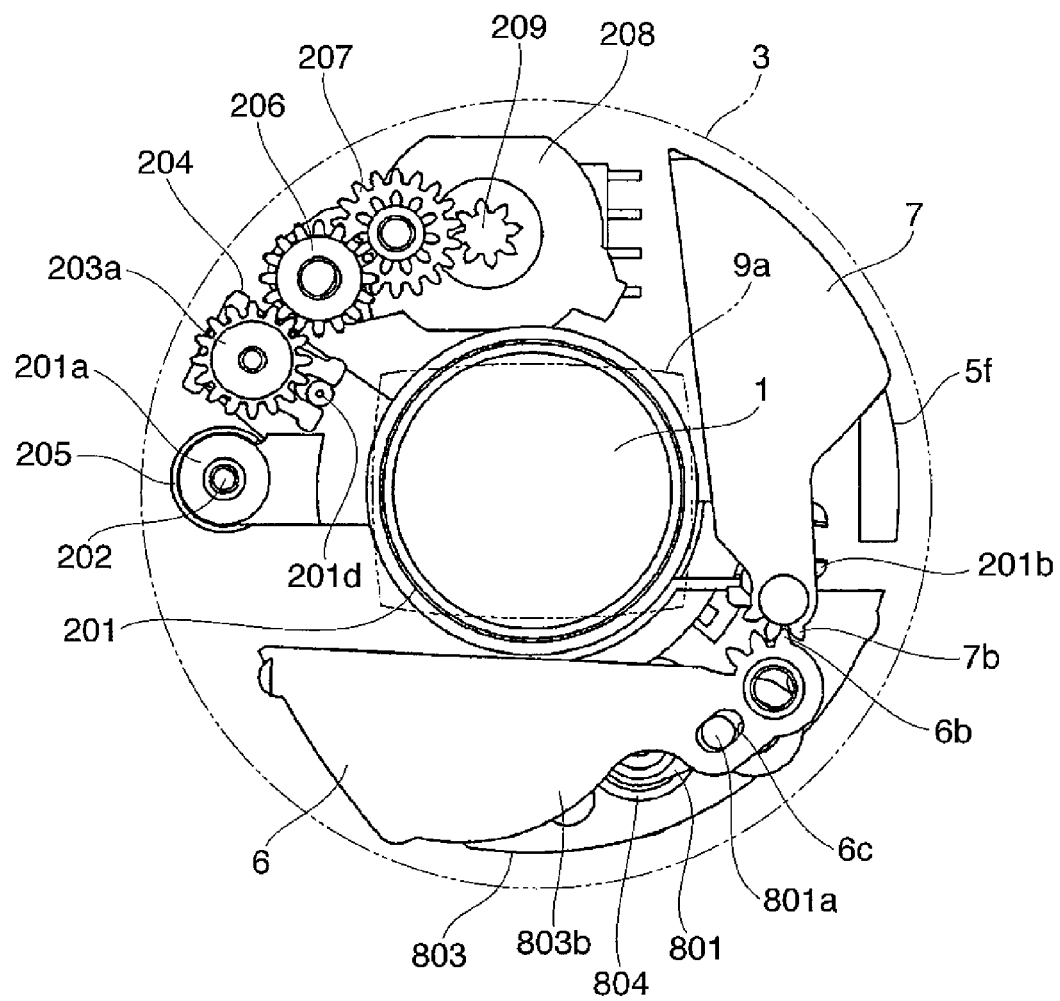
FIG. 15 is a front view showing the barrier driving unit in a barrier open position.

FIG. 11 is a perspective view showing the barrier driving unit 8 which is in a barrier closed position. FIG. 12 is a perspective view showing the barrier driving unit 8 in a barrier open position, and FIG. 13 is a perspective view showing the barrier driving unit 8 when an external force is applied in the direction of opening the barrier members 6, 7. FIG. 14 is a front view showing the barrier driving unit in a barrier closed position, and FIG. 15 is a front view showing the barrier driving unit in a barrier open position.

In FIGS. 11 to 15, the forward/backward moving cylinder 3 and the fixed base plate member 20 are shown only partly. When the lens barrel is in the collapsed position (FIGS. 1 and 2), the barrier 6 and 7 are closed (FIGS. 11 and 14). At this time, the second barrier drive member 802 is in a state where it has been rotated counterclockwise, with the lever arm portion 802e thereof being in contact with the barrier cam portion 20a of the fixed base plate member 20 and with the second spring member 805 having been charged. The first barrier drive member 801 coupled with the second barrier drive member 802 through the first spring member 804 is also in a state where it has been rotated counterclockwise.

Because the barrier member 6 is connected at its elongated hole 6c to the convex part 801a of the first barrier drive member 801 and because the gear portion 7b of the barrier member 7 is in mesh with the gear portion 6b of the barrier member 6, the barrier member 6 has been rotated clockwise around the hole 6a and the barrier member 7 has been rotated counterclockwise around the shaft portion 7a. Thus, the barrier members 6, 7 are brought into a closed state (FIGS. 11 and 14).

When an unexpected external force is applied in the direction of opening the barrier members 6, 7 which are in the closed state, the first barrier drive member 801 is caused to rotate clockwise. As described above, the first and second barrier drive members 801 and 802 coupled together through the first spring member 804 are relatively rotatable in the direction of charging the first spring member 804 by an angle corresponding to the circumferential length of the notch portion 802f. By being charged, the first spring member 804 can absorb and avoid undue mechanical strain.

When the lens barrel is transferred to the image-taking position (FIGS. 7 and 8), a barrier open state is attained (FIGS. 12 and 15). At this time, through the above described forward/backward operation of the whole lens barrel, the lever arm portion 802e of the second barrier drive member 802 is disengaged from the barrier cam portion 20a of the fixed base plate member 20 with the movement of the forward/backward moving cylinder 3 in the optical axis direction from the collapsed position to the image-taking position. As a result, the second barrier drive member 802 rotates in the (clockwise) urging direction of the second spring member 805, and the first barrier drive member 801 coupled with the second barrier drive member 802 through the first spring member 804 also rotates clockwise.

Since the barrier member 6 is connected at its elongated hole 6c to the convex part 801a of the first barrier drive member 801, the barrier member 6 rotates counterclockwise around the hole 6a. Furthermore, since the gear portion 7b is in mesh with the gear portion 6b of the barrier member 6, the barrier member 7 rotates clockwise around the shaft portion 7a. As a result, the convex part 5f of the first base plate member 5 comes to contact with a side surface of the barrier member 7. Thus, the barrier members 6, 7 are brought into an open state (FIGS. 12 and 15).

As explained above, according to this embodiment, the opening/closing operation plane D of the barrier members 6, 7 is made overlap the object-side focus stroke area L1 of the main guide portion 201a of the first lens holding member 201 as viewed in the optical axis direction. This eliminates the necessity of arranging the barrier opening/closing operation plane and the focus stroke area in series as viewed in the optical axis direction, which the prior art requires, whereby the length (collapsed length) of the lens barrel in the collapsed position can be shortened.

Furthermore, the above described configuration can increase the length of engagement between the first lens holding member 201 and the guide member 202 of the main guide portion 201a while securing a sufficient focus stroke, whereby the inclination of the first lens group 1 with respect to the optical axis direction can be suppressed, making it possible to realize a high accuracy lens barrel.

Furthermore, the first lens holding member 201 has the main guide portion 201a formed integrally therewith, which makes it easy to secure the required parallelism between the optical axis of the first lens group 1 held by the first lens holding member 201 and the axial center line of the hole which is formed in the main guide portion 201a of the first lens holding member 201 and to which the guide member 202 is engaged. As a result, it is possible to realize a high accuracy focus mechanism.

Furthermore, the first base plate member 5 has the guide shaft portion 5a which is formed integrally therewith and which engages with the sub guide portion 201b of the first lens holding member 201. This eliminates the necessity for providing parts such as the guide member 202 on the sub guide portion 201b side, whereby the number of parts and the cost can be reduced. Furthermore, on the sub guide portion 201b side, it is unnecessary to provide the positioning portion 3e for positioning the guide member 202, and therefore, it is possible to attain the required space extending in the optical axis direction.

The above described embodiment has explained a lens barrel, but the present invention is also applicable to an image-pickup apparatus in which a lens barrel is mounted.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2005-301820, filed Oct. 17, 2005 which is hereby incorporated by reference herein in its entirety.

What is claimed is:

1. A lens barrel comprising:
a cylinder movable along an optical axis direction between a collapsed position and an extended position, at which an image is taken;
a barrier member mounted to said cylinder and that opens/closes a front face of an image-taking lens;
a barrier drive mechanism mounted to said cylinder and that moves said barrier member between an open position where the front face of the image taking lens is exposed and a closed position where the front face of the image taking lens is closed;
a guide member mounted to said cylinder and that extends along the optical axis direction, wherein said guide member is fixedly positioned relative to said cylinder;
a lens holding member having a holding portion that holds the image-taking lens and a guide portion that engages the guide member to guide the image-taking lens along the optical axis direction; and
a lens drive mechanism that causes said lens holding member to move forward or backward in the optical axis direction, while said holding portion is engaged with said guide member,
wherein said barrier member lies substantially along a plane that is perpendicular to the optical axis direction,
wherein said barrier member is in the open position when the cylinder is in the extended position, and
wherein said guide portion of said lens holding member is movable along the optical axis direction and intersects the plane of said barrier member when the cylinder is in the extended position.

2. The lens barrel according to claim 1, wherein said guide portion also prevents said lens holding member from rotating.

3. The lens barrel according to claim 1, wherein said guide portion of said lens holding member is formed integrally with said lens holding member.

4. An image-pickup apparatus comprising:
a camera main body; and
a lens barrel coupled to said camera main body, the lens barrel including:
a cylinder movable along an optical axis direction between a collapsed position and an extended position, at which an image is taken;
a barrier member mounted to said cylinder and that opens/closes a front face of an image-taking lens;
a barrier drive mechanism mounted to said cylinder and that moves said barrier member between an open position where the front face of the image taking lens is exposed and a closed position where the front face of the image taking lens is closed;
a guide member mounted to said cylinder and that extends along the optical axis direction, wherein said guide member is fixedly positioned relative to said cylinder;
a lens holding member having a holding portion that holds the image-taking lens and a guide portion that engages the guide member to guide the image-taking lens along the optical axis direction; and a lens drive mechanism that causes said lens holding member to move forward or backward in the optical axis direction, while said holding portion is engaged with said guide member, wherein said barrier member lies substantially along a plane that is perpendicular to the optical axis direction, wherein said barrier member is in the open position when the cylinder is in the extended position, and wherein said guide portion of said lens holding member is movable along the optical axis direction and intersects the plane of said barrier member when the cylinder is in the extended position.

* * * * *